United States Patent
Eliáš et al.

(10) Patent No.: US 9,652,387 B2
(45) Date of Patent: May 16, 2017

(54) CACHE SYSTEM WITH MULTIPLE CACHE UNIT STATES

(71) Applicant: Red Hat, Inc., Raleigh, NC (US)

(72) Inventors: Filip Eliáš, Vyšní Lhoty (CZ); Filip Nguyen, Kaminky (CZ)

(73) Assignee: Red Hat, Inc., Raleigh, NC (US)

( * ) Notice: Subject to any disclaimer, the term of this patent is extended or adjusted under 35 U.S.C. 154(b) by 63 days.

(21) Appl. No.: 14/146,896

(22) Filed: Jan. 3, 2014

(65) Prior Publication Data

US 2015/0193343 A1    Jul. 9, 2015

(51) Int. Cl.
| | | |
|---|---|---|
| *G06F 12/08* | (2016.01) | |
| *G06F 12/0806* | (2016.01) | |
| *G06F 12/0891* | (2016.01) | |
| *G06F 12/0817* | (2016.01) | |

(52) U.S. Cl.
CPC ...... *G06F 12/0806* (2013.01); *G06F 12/0891* (2013.01); *G06F 12/0828* (2013.01); *G06F 2212/621* (2013.01)

(58) Field of Classification Search
CPC .............. G06F 8/4442; G06F 11/0073; G06F 11/3037; G06F 12/0815; G06F 12/0868; G06F 12/0871; G06F 12/0893
USPC .................................................. 711/113, 137
See application file for complete search history.

(56) References Cited

U.S. PATENT DOCUMENTS

| | | | | |
|---|---|---|---|---|
| 5,555,400 | A | * | 9/1996 | Groves et al. ............... 711/165 |
| 5,608,890 | A | * | 3/1997 | Berger et al. ................ 711/113 |
| 5,619,676 | A | * | 4/1997 | Fukuda et al. ............... 711/137 |
| 6,826,651 | B2 | | 11/2004 | Michael et al. |
| 7,546,422 | B2 | | 6/2009 | George et al. |
| 7,797,495 | B1 | | 9/2010 | Lepak |
| 2003/0041215 | A1 | | 2/2003 | George et al. |
| 2006/0041717 | A1 | * | 2/2006 | Rosker et al. ............... 711/113 |
| 2008/0005484 | A1 | * | 1/2008 | Joshi ............................ 711/141 |
| 2010/0245377 | A1 | * | 9/2010 | Ito ......................... H04N 1/603 345/589 |
| 2011/0208919 | A1 | * | 8/2011 | Pruthi ......................... 711/137 |
| 2012/0290717 | A1 | | 11/2012 | Luna |

FOREIGN PATENT DOCUMENTS

| | | |
|---|---|---|
| CN | 101957800 | 1/2011 |
| JP | 2003280987 | 10/2003 |

OTHER PUBLICATIONS

Ari et al., "ACME: Adaptive Caching Using Multiple Experts," 16 pages.
Haraty et al., "Rule-Based Data Mining Cache Replacement Strategy," International Journal of Data Warehousing and Mining, Jan.-Mar. 2013, 9(1), pp. 56-69 (14 pages total), IGI Global.

(Continued)

*Primary Examiner* — Mark Giardino, Jr.
*Assistant Examiner* — Masud Khan
(74) *Attorney, Agent, or Firm* — Lowenstein Sandler LLP

(57) ABSTRACT

A cache system stores a number of different datasets. The cache system includes a number of cache units, each in a state associated with one of the datasets. In response to determining that a hit ratio of a cache unit drops below a threshold, the state of the cache unit is changed and the dataset is replaced with that associated with the new state.

20 Claims, 7 Drawing Sheets

(56) References Cited

OTHER PUBLICATIONS

Anandharaj, G. et al.,"A Distributed Cache Management Architecture for Mobile Computing Environments," IEEE International Advance Computing Conference (IACC 2009), Mar. 6-7, 2009, 7 pages, Patiala, India.
Fawaz et al., "DCIM: Distributed Cache Invalidation Method for Maintaining Cache Consistency in Wireless Mobile Networks," IEEE Transactions on Mobile Computing, Apr. 2013, 14 pages, vol. 12, No. 4.

* cited by examiner

CACHE SYSTEM WITH MULTIPLE CACHE UNIT STATES

TECHNICAL FIELD

Embodiments of the present invention relate to a cache system, and in particular, relates to a cache system having multiple defined states for cache units.

DESCRIPTION OF THE RELATED ART

When multiple clients request data stored in a data store, the load on the data store may be reduced by using a cache that stores at least a portion of the data. Client requests for data may be at least partially serviced by the cache, thereby reducing the load on the data store and more quickly servicing the client requests.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for managing data requests with a cache system. As described above, when multiple clients request data stored in a data store, the load on the data store may be reduced by using a cache including one or more cache units that each store at least a portion of the data. Client requests for data may be at least partially serviced by the cache units, thereby reducing the load on the data store and more quickly servicing the client requests.

A cache unit may be both faster and smaller than the data store such that only a portion of the data of the data store may be stored in the cache unit. Thus, when a request for data from the data store is received at the cache unit, there is a possibility that the request will indicate data that is available at the cache unit (designated a "hit") and a possibility that the request will indicate data that is not available at the cache unit (designated a "miss"). When a miss occurs, the cache unit may service the request by retrieving the requested data from the data store and evicting other data to make room for the requested data.

The cache may determine which data to evict using any of a number of algorithms, such as least recently used (LRU), least frequently used (LFU), and first in first out (FIFO). Some algorithms may be inefficient in environments where the type of requests periodically changes over time or in response to an event. Thus, a data store may mainly receive requests for a first type of data during a first time and for a second type during a second time. As an example, a weather data store may mainly receive requests for a daily weather report in various locations during morning hours, but receive requests for tomorrow's weather forecast in the various locations during evening hours.

Rather than evict data of the first type one-by-one when requests for data of the second type are requested and result in a miss, if enough requests for data of the second type are requested, the cache may switch states and flush the data of the first type and fill itself with data of the second type.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
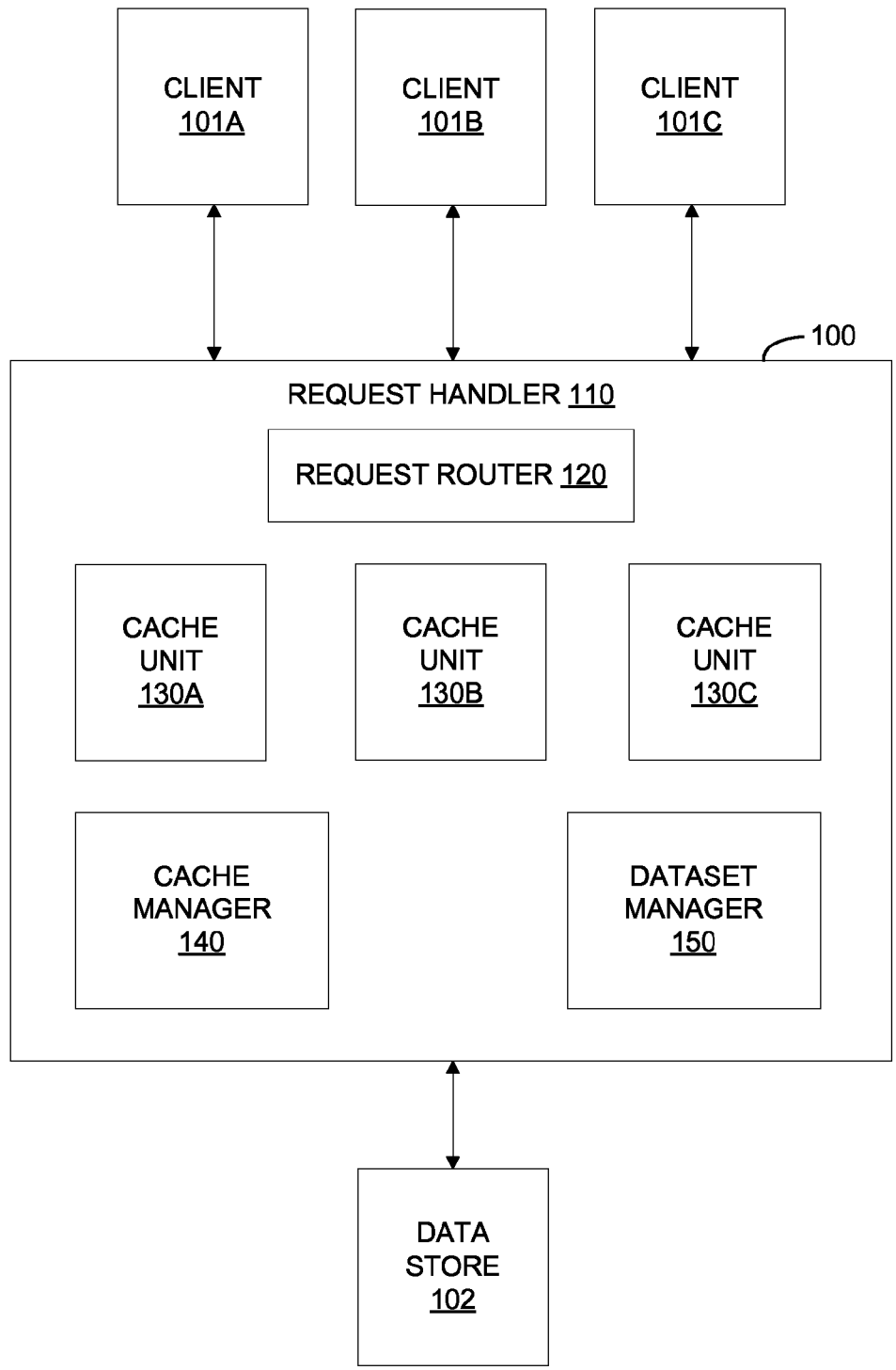
FIG. 1 is a block diagram that illustrates an embodiment of cache system.

FIG. 1 is a block diagram that illustrates an embodiment of cache system 100 coupled between a number of clients 101A-101C and a data store 102. The clients 101A-101C may submit data requests to a request handler 110 of the cache system 100 requesting data from the data store 102. Because the requests may be sent to the request handler 110 rather than the data store 102, the load on the data store 102 is reduced. Further, the request handler 110 may be able to serve the requests faster than the data store 102, particularly when a number of requests are received from a number of different clients 101A-101C.

The request handler 110 receives data requests from the clients 101A-101C at a request router 120. For each received data request, the request router 120 selects one of a number of cache units 130A-130C and routes the data request to the selected cache unit. In one embodiment, the request router 120 assigns each client 101A-101C to a particular cache unit 130A-130C for a user session and routes each data request of the user session to the assigned cache unit 130A-130C. In one embodiment, cache units 130A-130C are assigned to clients randomly. In another embodiment, cache units 130A-130C are assigned based on a routing table. A routing table may include a mapping that maps request source addresses associated with clients to particular states. A particular embodiment of a method of assigning a cache unit to a client based on a routing table is described in more detail below with respect to FIG. 5.

Each of the cache units 130A-130C is assigned a particular state and stores a dataset associated with the particular state. The dataset is a subset of the data from the data store 102 which may include copies of data stored in the data store 102 or precomputed values based on the data stored in the data store 102. Each of the cache units 130A-130C responds to data requests routed by the request router 120 to the cache unit 130A-130C from a client 101A-101C by providing the requested data to the client 101A-101C.

If the requested data is within the dataset stored in the cache unit 130A-130C, the cache unit 130A-130C provides the requested data to the client 101A-101C and the data request is designated a "hit". If the requested data is not within the dataset stored in the cache unit 130A-130C, the cache unit 130A-130C retrieves the requested data from the data store 102 into the cache unit 130A-130C and provides the requested data to the client 101A-101C. Such a data request is designated a "miss". Further, because retrieving the data from the data store 102 into the cache unit 130A-130C causes the dataset of the cache unit 130A-130C to be altered (at least because the dataset now includes the requested data whereas the dataset lacked it before and possibly because other data was evicted), the alteration to the dataset is propagated to other cache units 130A-130C in the same state. A particular embodiment of a method of a cache unit responding to a data request is described in more detail below with respect to FIG. 3.

If a cache unit 130A-130C receives a number of data requests that are designated as misses, a cache manager 140 will respond by changing the state of the cache unit 130A-130C. Different cache units 130A-130C may be in different states at the same time. As noted above, each of the cache units 130A-130C is assigned a particular state and stores a dataset associated with the particular state. The dataset associated with the particular state assigned to a cache unit 130A-130C may be altered as described above (and below with respect to FIG. 3). Further, the cache manager 140 may change the state of a cache unit completely replacing the data in the cache unit with the dataset associated with the new state.

The cache manager 140 may decide to change the state of a cache unit 130A-130C by analyzing the number of data requests designated as hits and the number of data requests designated as misses. In one embodiment, the cache manager 140 determines a cache hit ratio based on the number of hits and misses. The cache manager 140 may decide to change the state of a cache unit 130A-130C if the cache hit ratio drops below a threshold. The threshold may be different for different cache units 130A-130C. The threshold(s) may be set by an administrator. For example, in one embodiment, none of the cache units 130A-130C have the same threshold. This achieves a fuzzy transition of the cache system 100 between states.

In one embodiment, the cache hit ratio is determined as the number of hits in a time window divided by the total number of data requests in the time window. The time window may be ten seconds, thirty seconds, a minute, five minutes, thirty minutes, an hour, or any other time window. The time window may be the length of a user session, beginning when a client is assigned to the cache unit. In another embodiment, the cache hit ratio is determined as the number of hits within the last N requests, where N is a number which may be 10, 20, 50, 100, or any other number. In one embodiment, the cache manager 140 decides to change the state of a cache unit 130A-130C based on a number of consecutive misses. Thus, the cache manager 140 decides to change the state of a cache unit 130A-130C if three consecutive data requests are misses, or five, or ten, or any other number. A particular embodiment of a method of changing a state of a cache unit 130A-130C is described in more detail below with respect to FIG. 2.

The datasets associated with each state are stored in a dataset manager 150. The dataset manager 150 may receive update commands from the cache units 130A-130C, each update command indicating that the dataset associated with a particular state has been altered. The dataset manager 150 may respond to the update commands by propagating the alteration to other cache units 130A-130C in the same state.

The dataset manager 150 may monitor the data store 102 and determine that the data of the data store 102 has been updated. Thus, the dataset manager 150 may determine that any dataset including the updated data has been altered and may propagate the alteration to cache units 130A-130C in states associated with those datasets.

The dataset manager 150 may also determine whether two or more datasets are similar or dissimilar and thereby assist in generating the datasets in an initial phase of the cache system 100. The initial phase may be performed upon determination that client behavior has changed. A particular method of generating datasets is described in more detail below with respect to FIGS. 4A-4B.

Although FIG. 1 illustrates three clients 101A-101C and three cache units 130A-130C, it is to be appreciated that the cache system may service any number of clients and may include any number of cache units 130A-C. In particular, the cache system 100 may include less than three cache units 130A-130C or more than three cache units 130A-130C. In one embodiment, the cache system 100 may have a dynamic number of a cache units 130A-130C, that is, the cache system 100 may include a first number of cache units 130A-130C at a first time and a second number of cache units 130A-130C at a second time. For example, the cache system 100 may continue to operate if one of the cache units 130A-130C were to go offline. As another example, the cache system 100 may, without interruption of operation, add additional cache units 130A-130C.

Although FIG. 1 illustrates the cache system 100 interposed between the clients 101A-101C and the data store 102, it is to be appreciated that the clients 101A-101C, the cache system 100, and the data store 102 may be connected via a network in a cloud. The network may include a public network or a private network and may include a wide area network, a local area network, or a personal area network.

Although FIG. 1 illustrates the request handler 110 as a single unit, it is to be appreciated that the various components, e.g., the request router 120, cache units 130A-130C, cache manager 140, and dataset manager 150 may be physically separate and located remote from one another as part of a distributed system. Further, one or more of the cache units 130A-130C may be physically separate and located remote from others of the cache units 130A-130C. Each of the request router 120, cache units 130A-130C, cache manager 140, and dataset manager 150 may be embodied as a computer system connected to a network. Each component may be a physical or virtual machine. An embodiment of a computer system is described in detail below with respect to FIG. 6.

Although each component may be separate, some components may be combined with others. For example, in one embodiment, the request router 120, cache manager 140, and dataset manager 150 are a single unit and each cache unit 130A-130C is a separate unit.

Figure 2:
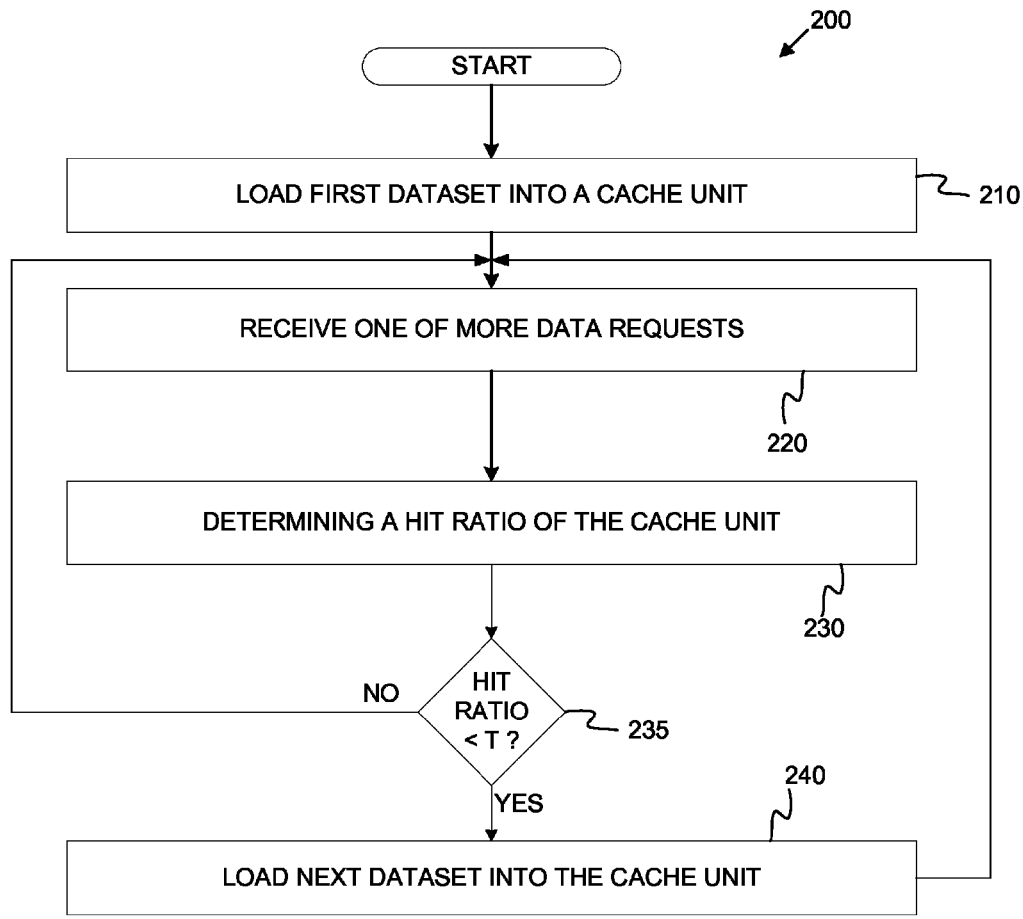
FIG. 2 is a flow diagram that illustrates an embodiment of a method of changing a cache unit from a first state to a second state.

FIG. 2 is a flow diagram that illustrates an embodiment of a method 200 of changing a cache unit from a first state to a second state. The method 200 may be performed by processing logic that may include hardware (e.g., circuitry, dedicated logic, programmable logic, microcode, etc.), software (e.g., instructions executed by a processing device), firmware, or a combination thereof. For example, method 200 may be performed by the request handler 100 of FIG. 1. It is to be appreciated that the method 200 may be performed for any number of cache units simultaneously. For ease of reference, the method 200 is described for a single cache unit.

At block 210 of method 200, a first dataset is loaded into a cache unit. The first dataset is associated with a first state assigned to the cache unit. In one embodiment, the dataset (that includes the data) is transmitted to the cache unit. In another embodiment, a dataset descriptor (that identifies the data, but excludes the data) is transmitted to the cache unit and the cache unit retrieves the data from a data store. The dataset (or dataset descriptor) may be transmitted to the cache unit by the dataset manager 150 of FIG. 1.

At block 220, one or more data requests are received. The data requests may be received by the request router 120 of FIG. 1 (along with other data requests) and routed to the cache unit. Each data request may be received from a client and refer to a data unit stored at least in the data store. In response to the data request, the cache unit may provide the requested data unit to the client.

As described above (and further below with respect to FIG. 3), if the first dataset includes the data unit indicated by a data request, the cache unit provides the requested data to the client and the data request is designated a "hit". If the requested data is not within the first dataset, the cache unit retrieves the requested data from the data store, altering the first dataset, and provides the requested data. Such a data request is designated a "miss".

At block 230, a hit ratio of the cache unit is determined. The hit ratio may be determined by the cache unit itself or by the cache manager 140 of FIG. 1. In one embodiment, the hit ratio is determined as the number of hits divided by the total number of data requests, e.g., the sum of the number of hits and the number of misses. Although the method 200 of FIG. 2 is described with respect to a hit ratio, any performance metric may be used. In one embodiment, the performance metric is a number of consecutive misses. In another embodiment, a performance metric is an average time in responding to the request. Thus, if a cache unit is more often retrieving data from the data store due to a miss, the average time increases. Further, as the load on the data store increases, this average time increases further. Thus, using average time as a performance metric dynamically weights misses based on the load on the data store. Any other performance metric may be used.

At block 235, it is determined whether the hit ratio is less than a threshold. In general, it is determined whether the performance metric is adequate or inadequate. Determining the adequacy of the performance metric may be performed by the cache unit itself or by the cache manager 140 of FIG. 1. In one embodiment, the hit ratio threshold is 10%. In another embodiment, the hit ratio threshold is 5% or 2% or 1% or any other value. The hit ratio threshold may be different for different cache units. For example, 5 cache units may have hit ratio thresholds of 5%, 10%, 15%, 20%, and 25%.

If the hit ratio is not below the threshold (or the performance metric is determined to be adequate), the method returns to block 220 to receive more data requests. If the hit ratio is below the threshold (or the performance metric is determined to be inadequate), the method continues to block 240 before returning to block 220 to receive more data requests.

At block 240, a next state is assigned to the cache unit and a next dataset associated with the next state is loaded into the cache unit. The next dataset may be loaded in a similar manner as the first dataset as described above. In one embodiment, the dataset (including the data) is transmitted to the cache unit. In another embodiment, a dataset descriptor (excluding the data) is transmitted to the cache unit and the cache unit retrieves the data from a data store. The dataset (or dataset descriptor) may be transmitted to the cache unit by the dataset manager 150 of FIG. 1.

In one embodiment, loading the next dataset into the cache unit includes completely clearing the first dataset from the cache unit prior to loading the next dataset into the cache unit. However, because the first dataset and the next dataset may include some data units in common, a complete refresh may be unnecessary. Thus, in one embodiment, state transition information is transmitted to the cache unit including information indicating the data which should be retained and the data which should be replaced. The state transition information may include the data which should be replaced, but exclude the data which should be retained.

As noted above, on either path of the method 200 from block 235, the method returns (eventually) to block 220. Thus, the method 200 may be repeated by further changing the state of the cache unit and loading multiple next datasets into the cache unit.

Figure 3:
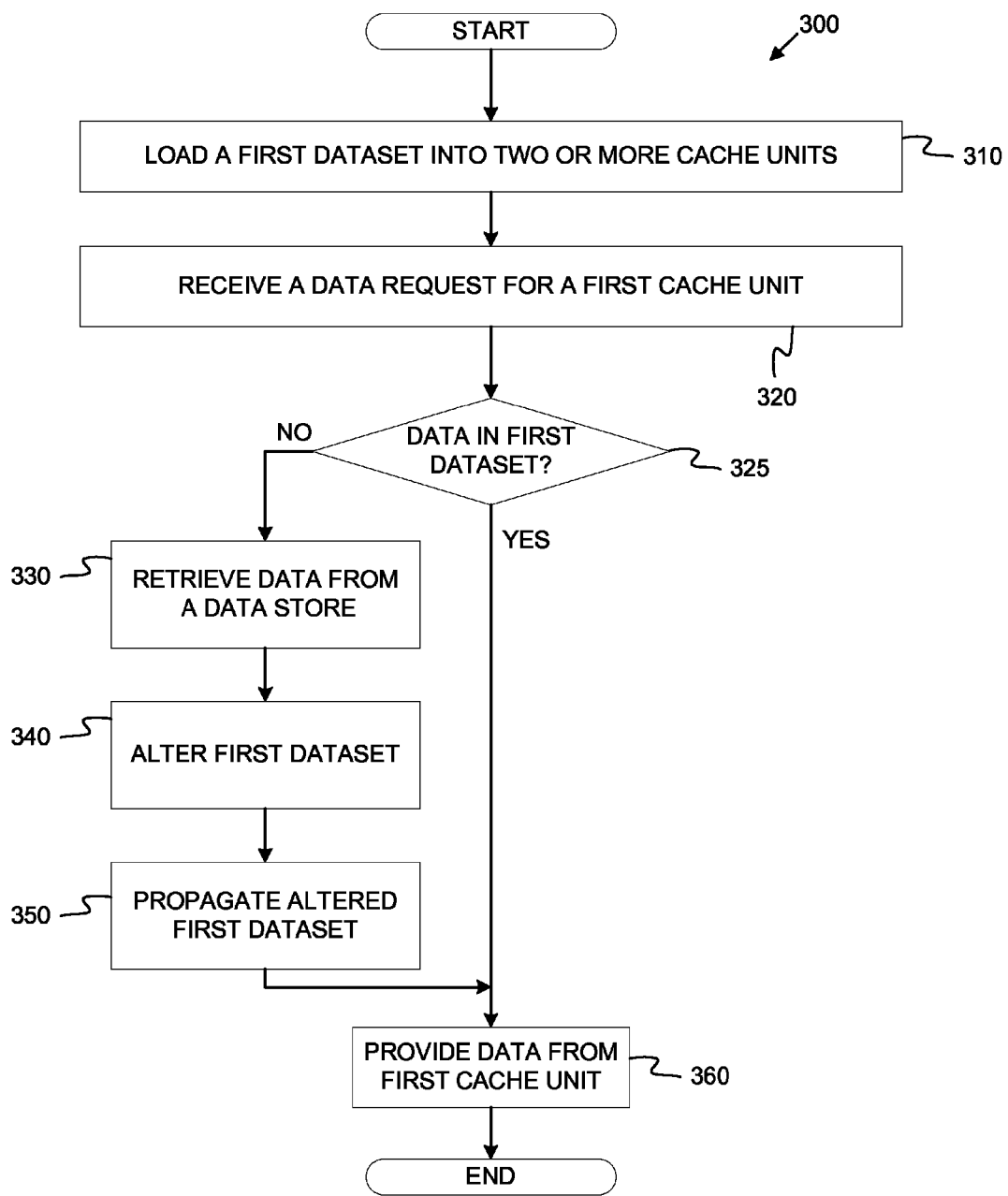
FIG. 3 is a flow diagram that illustrates an embodiment of a method of altering a state of a cache unit.

FIG. 3 is a flow diagram that illustrates an embodiment of a method of altering a state of a cache unit. The method 300 may be performed by processing logic that may include hardware (e.g., circuitry, dedicated logic, programmable logic, microcode, etc.), software (e.g., instructions executed by a processing device), firmware, or a combination thereof. For example, method 300 may be performed by the request handler 100 of FIG. 1.

At block 310 of method 300, a first dataset is loaded into two or more cache units. The first dataset is associated with a first state assigned to each of the two or more cache units. It is to be appreciated that other datasets associated with other states may also be loaded into other cache units and concurrently altered in a similar manner as described below. For ease of reference, only a first state is described with respect to FIG. 3.

In one embodiment, the first dataset (including the data) is transmitted to each of the two or more cache units. In another embodiment, a first dataset descriptor (excluding the data) is transmitted each of the cache units and the cache unit retrieves the data from a data store. In another embodiment, the first dataset is transmitted to one of the two more cache units and the others of the two or more cache units retrieve the data from that one cache unit. The dataset (or dataset descriptor) may be transmitted to the cache units by the dataset manager 150 of FIG. 1.

At block 320, a data request is received for a first cache unit of the two or more cache units. The data request may be received by the request router 120 of FIG. 1 (along with other data requests) and routed to the first cache unit. The data request may be received from a client and refer to a data unit stored at least in the data store. In response to the data request, the cache unit may provide the requested data unit to the client (e.g., in block 360 described below).

At block 325, it is determined whether the requested data is in the first dataset associated with the first state assigned to the first cache unit. The determination may be performed by the cache unit itself. If the first dataset includes the requested data and the requested data is stored in and available from the first cache unit, the method 300 moves to block 360 where the requested data is provided from the first cache unit to the client. As noted above, such a data request is designated a "hit".

If the first dataset does not include the requested data and the requested data is not stored in or available from the first cache unit, the method 300 moves to block 330. At block 330, the requested data is retrieved from the data store to the first cache unit. In another embodiment, the requested data may be retrieved from another source, such as another cache unit in a different state or from the dataset manager 150 of FIG. 1. As noted above, such a data request is designated a "miss".

In block 340, the first dataset is altered. Retrieving the requested data into the first cache unit in block 330 alters the dataset stored in the first cache unit. The original dataset of the first cache unit, the unaltered first dataset, did not include the requested data, but the new dataset of the first cache unit does include the requested data. The first dataset is altered to be the new dataset of the first cache. Thus, the first dataset is altered from an unaltered first dataset to an altered first dataset. The first dataset, as altered, remains associated with the first state and the first cache unit remains assigned to the first state.

The first dataset may be further altered by eviction of data to make room for the requested data. Data may be evicted using any of a number of eviction algorithms, including least recently used (LRU), least frequently used (LFU), or first in first out (FIFO).

At block 350, the altered first dataset is propagated to others of the two or more cache units in the first state. Thus, when the first cache unit retrieves the requested data from the data store (and evicts other data), all other cache units in the first state are instructed to do the same. Thus, all cache units in the first state include the same data, the data in the first altered dataset. The method 300 continues from block 350 to block 360 where the requested data is provided from the first cache unit to the client.

Figure 4A:
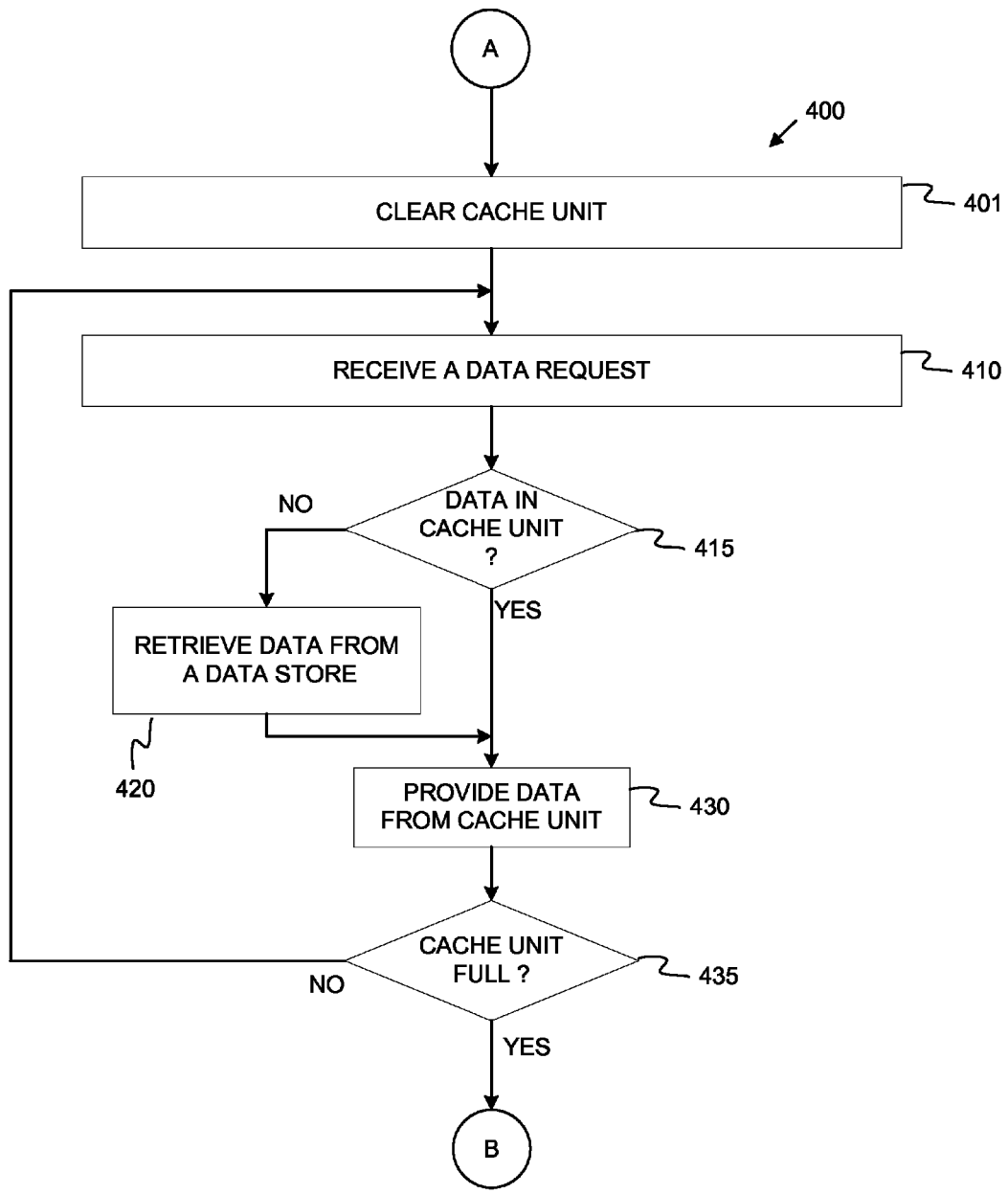
FIG. 4A is a first part of flow diagram that illustrates an embodiment of a method of generating states for a cache system.
Figure 4B:
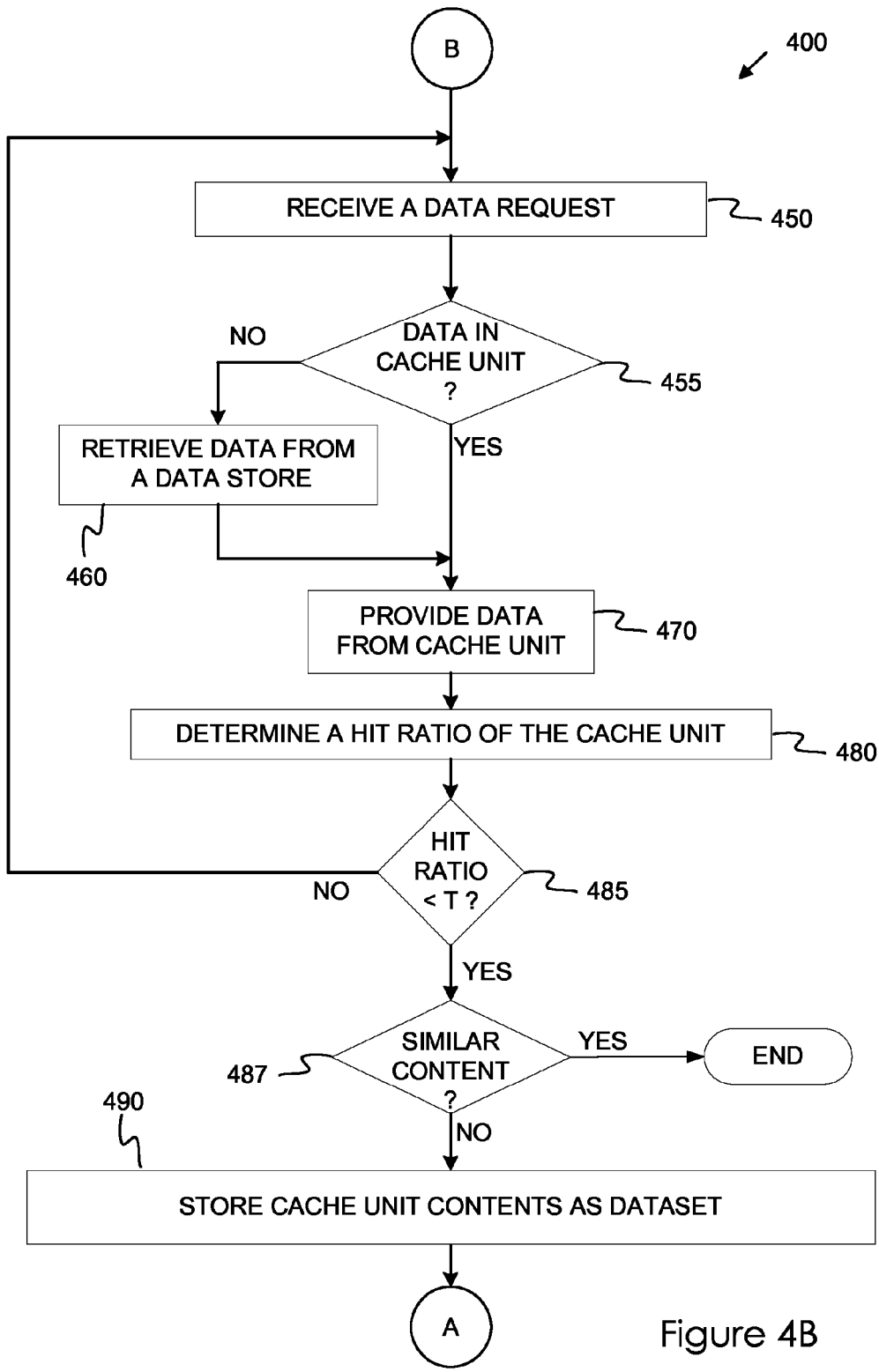
FIG. 4B is a second part of a flow diagram that illustrates an embodiment of a method of generating states for a cache system.

FIGS. 4A and 4B are a flow diagram that illustrates an embodiment of a method 400 of generating states for a cache system. The method 400 may be performed by processing logic that may include hardware (e.g., circuitry, dedicated logic, programmable logic, microcode, etc.), software (e.g., instructions executed by a processing device), firmware, or a combination thereof. For example, the method 400 may be performed by the request handler 100 of FIG. 1. The method 400 may be performed as an initial phase prior to an operational phase including, among other things, the methods 200 and 300 of FIGS. 2 and 3. Thus, the results of the method 400, a number of datasets, may be associated with a number of states that are assigned to cache units.

In one embodiment, the number of states is much greater than the number of cache units. For example, the number the states may be at least ten times greater than the number of cache units. As another example, the number of states may be at least a hundred times greater than the number of cache units.

At block 401 of the method 400, a cache unit is cleared of any data is stored in the cache. Although the method 400 is described with respect to a single cache unit, it is to be appreciated that the method 400 could be performed more multiple cache units. In one embodiment, each of the multiple cache units are maintained with the same data such that change in the dataset of one cache unit is propagated to all other cache units in a similar manner to the method 300 of FIG. 3.

At block 410, a data request is received. The data request may be received by the request router 120 of FIG. 1 (along with other data requests) and routed to the cache unit. The data request may be received from a client and refer to a data unit stored at least in the data store. In response to the data request, the cache unit may provide the requested data unit to the client (e.g., in block 430 as described below).

At block 415, it is determined whether the requested data is in the cache unit. The determination may be performed by the cache unit itself. If the requested data is stored in and available from the cache unit, the method 400 moves to block 430 where the requested data is provided from the cache unit to the client. As noted above, such a data request is designated a "hit".

If the requested data is not stored in or not available from the cache unit, the method 400 moves to block 420. At block 420, the requested data is retrieved from the data store to the cache unit before the method 400 moves to block 430 where the requested data is provided from the cache unit to the client. As noted above, such a data request is designated a "miss".

At block 435, it is determined if the cache unit is full. The determination may be performed by the cache unit itself. In general, at block 435, it may be determined if a dataset size limit has been reached. In one embodiment, the dataset size limit is the capacity of the cache unit. In another embodiment, a dataset size limit may be set which is less than the capacity of the cache unit. For example, the dataset size limit may be set as the capacity of a smallest one of a number of cache units. The dataset size limit may be size to any value.

If the cache unit is not full (or the dataset size limit has not been reached), the method 400 returns to block 410 where another data request is received. If the cache unit is full (or the dataset size limit has been reached), the method 400 moves to block 450 (of FIG. 4B).

In block 450, a data request is received. The data request may be received in the same manner as described above with respect to block 410. In block 455, it is determined whether the requested data is stored in the cache unit. The determination may be made in the same manner as described above with respect to block 415. Similarly, blocks 460 and 470 may be performed in the same manner as blocks 420 and 430 described above.

In block 480, a cache hit ratio of the cache unit is determined. The cache hit ratio may be determined by the cache unit itself or by the cache manager 140 of FIG. 1. In one embodiment, the cache hit ratio is determined as the number of hits divided by the total number of data requests, e.g., the sum of the number of hits and the number of misses. The cache hit ratio may be determined with respect to a time window, a number of data requests, or since an event occurred. For example, the cache hit ratio may be determined based on all data requests received since the cache unit was filled.

Although the method 400 of FIGS. 4A and 4B is described with respect to a cache hit ratio, any performance metric may be used, including those described above with respect to block 230 of FIG. 2.

At block 485, it is determined whether the cache hit ratio is less than a threshold. In general, it is determined whether the performance metric is adequate or inadequate. The determination may be performed in the same manner as block 235 of FIG. 2.

If the hit ratio is not below the threshold (or the performance metric is determined to be adequate), the method 400 returns to block 450 to receive more data requests. If the hit ratio is below the threshold (or the performance metric is determined to be inadequate), the method continues to block 487.

At block 487, it is determined whether the content of the cache unit is similar to that of the stored dataset associated with any other state. The determination may be performed by the dataset manager 150 of FIG. 1. If it is determined that the content of the cache unit is not similar to other datasets (or if no other datasets have been saved), the method moves to block 490.

In block 490, the contents of the cache unit are stored as a dataset associated with a new state. The contents may be stored as a dataset (or a dataset descriptor) by the dataset manager 150 of FIG. 1. Following block 490, the method 400 returns to block 401 (of FIG. 4A) where the cache unit is cleared.

The contents of the cache unit may be determined as similar to those of previous stored datasets associated with other states in any of a number of ways. In one embodiment, a similarity percentage is determined between the contents of the cache unit and all previous stored datasets. The similarity percentage may be determined as the number of common data units between two datasets divided by the average number of data units of the datasets. If the similarly percentage (or another similarity metric) is above a threshold, it may be determined that two datasets are similar. If the similarity percentage (or another similarity metric) is below a threshold, it may be determined that two datasets are dissimilar. The similarity of two datasets may be determined in other ways.

If the contents of the cache unit are determined as similar to those of a previous stored dataset, the method 400 ends. The method 400 may also end when a maximum number of states has been reached. In one embodiment, the method 400 only ends when a maximum number of states has been reached without regard to the similarity of datasets.

Figure 5:
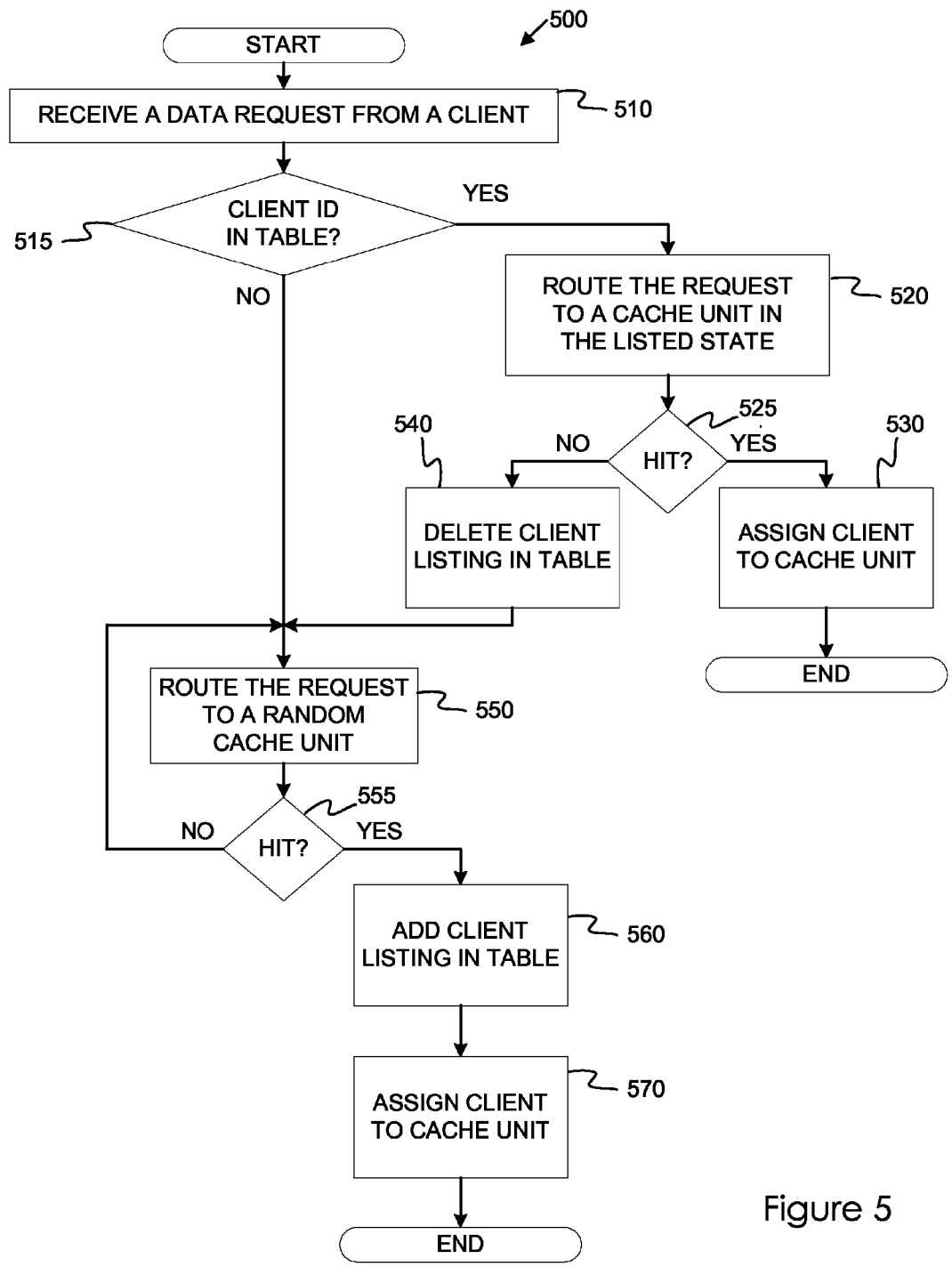
FIG. 5 is a flow diagram that illustrates an embodiment of a method of assigning a client to a cache unit.

FIG. 5 is a flow diagram that illustrates an embodiment of a method of assigning a client to a cache unit. The method 500 may be performed by processing logic that may include hardware (e.g., circuitry, dedicated logic, programmable logic, microcode, etc.), software (e.g., instructions executed by a processing device), firmware, or a combination thereof. For example, the method 500 may be performed by the request handler 100 of FIG. 1, such as by the request router 120 of FIG. 1.

At block 510, a data request is received from a client. The data request may refer to a data unit stored at least in the data store. In response to the data request, the requested data unit may be provided to the client by a cache unit assigned as described below.

At block 515, it is determined whether a routing table stores a client identifier in association with a state. The client identifier may comprise a source address of the data request. The data request may include the client identifier. The client identifier may comprise a MAC (media access control) address or an IP (internet protocol) address.

If the routing tables stores the client identifier in association with a state, the method 500 moves to block 520 where the data request is routed to a cache unit in the listed state.

In block 525 following block 520, it is determined if the data request routed to the cache unit in the listed state resulted in a hit or a miss. If the data request was a hit, the client is assigned to the cache unit in block 530 and further data requests from the client during the user session will be routed to the assigned cache unit. If the data request was a miss, the association between the client identifier and the listed state is deleted in block 540. In one embodiment, the client identifier and listed state are deleted. In another embodiment, only the listed state is deleted.

If the routing table does not store the client identifier in association with a state (because it never existed or because it was deleted), the method 500 moves to block 550 where the request is routed to a random cache unit.

In block 555, it is determined if the data request routed to the random cache unit resulted in a hit or a miss. If the data request was a hit, the state of the random cache unit is stored in association with the client identifier in the routing table (in block 560) and the client is assigned to the cache unit (in block 570) such that further data requests from the client during the user session will be routed to the assigned cache unit. If the data request was a miss, the method 500 returns to block 550 where the request is routed to another random cache unit.

If a request has been routed to all cache units without a hit, the client is assigned to any cache unit which will, in response, retrieve the data indicated in the data request.

Figure 6:
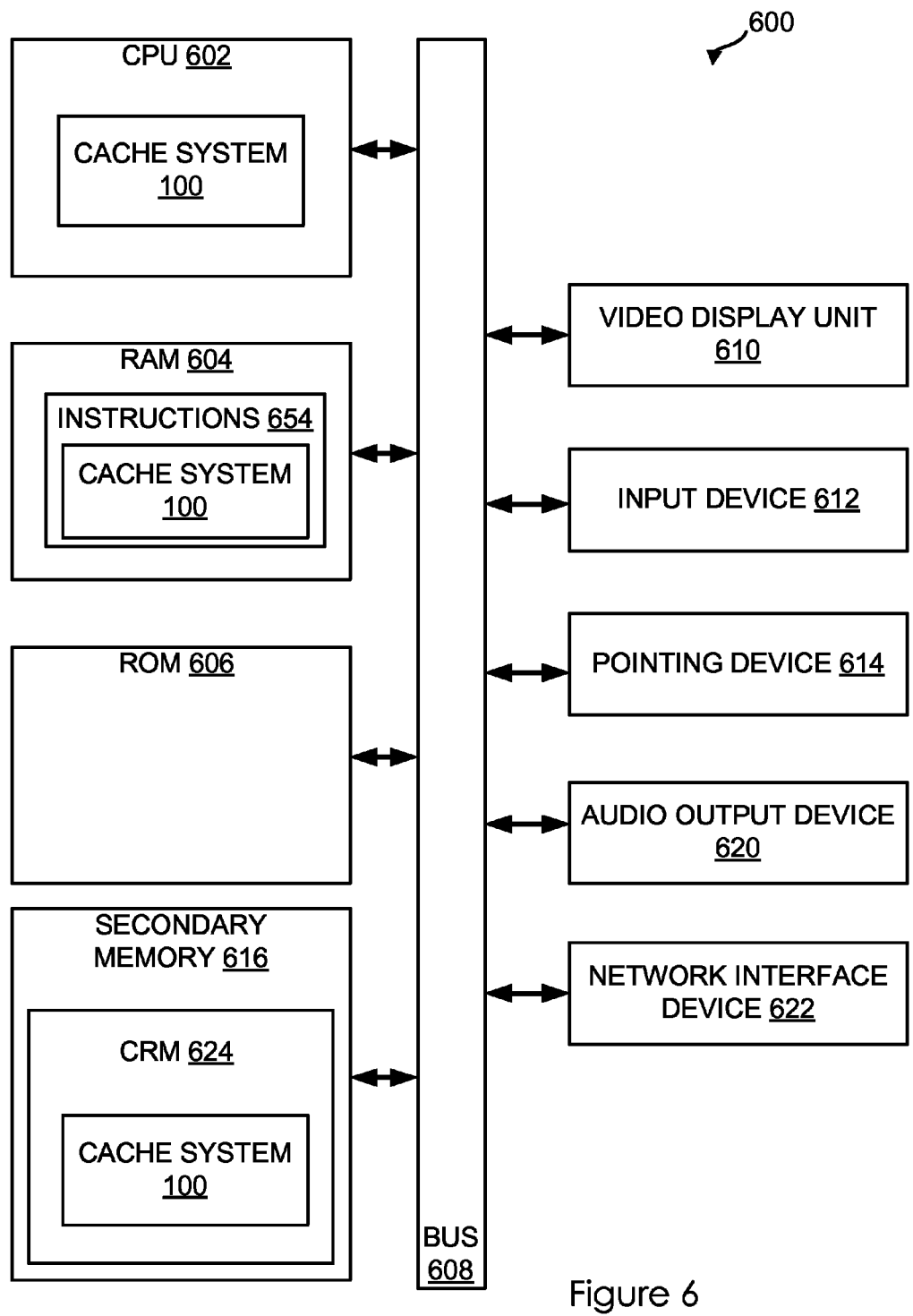
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to the cache system 100 of FIG. 1 or any of the components of the cache system 100, such as the request handler 110, request router 120, cache units 130A-130B, cache manager 140, or dataset manager 150. In embodiments of the present invention, the machine may be connected (e.g., networked) to other machines (e.g., other components of the cache system 100) in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., cache system 100). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    storing a plurality of datasets;
    loading a first dataset of the plurality of datasets into a first cache unit and a second cache unit of a plurality of cache units;
    determining, by a processing device, that a hit ratio is below a first hit ratio threshold associated with the first cache unit and above a second hit ratio threshold associated with the second cache unit, wherein the first hit ratio threshold is different from the second hit ratio threshold; and
    responsive to determining that the hit ratio is below the first hit ratio threshold associated with the first cache unit and above the second hit ratio threshold associated with the second cache unit, loading a second dataset of the plurality of datasets into the first cache unit, wherein the first dataset of the plurality of datasets is different than the second dataset of the plurality of datasets.

2. The method of claim 1, further comprising:
    loading the first dataset of the plurality of datasets into a third cache unit of the plurality of cache units;
    determining that the hit ratio is below the second hit ratio threshold associated with the second cache unit; and responsive to determining that the the hit ratio is below the second hit ratio threshold associated with the second cache unit, loading a third dataset of the plurality of datasets into the second cache unit, wherein the third dataset is different from the first dataset and the second dataset of the plurality of datasets.

3. The method of claim 1, further comprising:
determining that the hit ratio is below the first hit ratio threshold associated with the first cache unit and equal to the second hit ratio threshold associated with the second cache unit; and
responsive to determining that the hit ratio is below the first hit ratio threshold associated with the first cache unit and equal to the second hit ratio threshold associated with the second cache unit, loading the second dataset of the plurality of datasets into the first cache unit.

4. The method of claim 1, further comprising:
receiving an alteration to the first dataset of the plurality of datasets; and
in response to receiving the alteration, loading an altered first dataset of the plurality of datasets into other cache units of the plurality of cache units.

5. The method of claim 1, further comprising:
receiving a request to access a data store; and
selecting the first cache unit from the plurality of cache units to service the request.

6. The method of claim 1, wherein determining that the hit ratio is below the first hit ratio threshold associated with the first cache unit and above the second hit ratio threshold associated with the second cache unit comprises:
identifying a first number indicative of a number of data requests received by the first cache unit and second cache unit within a window, each data request requesting a data unit;
identifying a second number indicative of a number of the data requests requesting a data unit in the first dataset of the plurality of datasets within the window;
identifying the hit ratio of the first cache unit and second cache unit by dividing the second number by the first number; and
comparing the hit ratio to the first hit ratio threshold and the second hit ratio threshold.

7. The method of claim 1, further comprising generating the plurality of datasets, wherein generating the plurality of datasets comprises:
receiving a first plurality of data requests requesting a respective first plurality of data units;
loading the first plurality of data units into the first cache unit;
receiving a second plurality of data requests requesting a respective second plurality of data units;
determining a hit ratio of the first cache unit in responding to the second plurality of data requests;
determining that the hit ratio of the first cache unit in responding to the second plurality of data requests is below a dataset generation hit ratio threshold; and
responsive to the determination that the hit ratio of the first cache unit in responding to the second plurality of data requests is below a dataset generation hit ratio threshold, storing the first plurality of data units as the first dataset of the plurality of datasets.

8. A non-transitory computer-readable medium comprising instructions encoded thereon which, when executed by a processing device, cause the processing device to:
store a plurality of datasets;
load a first dataset of the plurality of datasets into a first cache unit and a second cache unit of a plurality of cache units;
determine, by the processing device, that a hit ratio is below a hit first ratio threshold associated with the first cache unit and above a second hit ratio threshold associated with the second cache unit, wherein the first hit ratio threshold is different from the second hit ratio threshold; and
responsive to determining that the hit ratio is below the first hit ratio threshold associated with the first cache unit and above the second hit ratio threshold associated with the second cache unit, load a second dataset of the plurality of datasets into the first cache unit, wherein the first dataset of the plurality of datasets is different than the second dataset of the plurality of datasets.

9. The non-transitory computer-readable medium of claim 8, the processing device further to:
load the first dataset of the plurality of datasets into a third cache unit of the plurality of cache units;
determine that the hit ratio is below the second hit ratio threshold associated with the second cache unit; and
responsive to determining that the hit ratio is below the second hit ratio threshold associated with the second cache unit, load a third dataset of the plurality of datasets into the second cache unit, wherein the third dataset is different from the first dataset and the second dataset of the plurality of datasets.

10. The non-transitory computer-readable medium of claim 8, the processing device further to:
determine that the hit ratio is below the first hit ratio threshold associated with the first cache unit and equal to the second hit ratio threshold associated with the second cache unit; and
responsive the determination that the hit ratio is below the first hit ratio threshold associated with the first cache unit and equal to the second hit ratio threshold associated with the second cache unit, load the second dataset of the plurality of datasets into the first cache unit.

11. The non-transitory computer-readable medium of claim 8, the processing device further to:
receive an alteration to the first dataset of the plurality of datasets; and
in response to receiving the alteration, load an altered first dataset of the plurality of datasets into other cache units of the plurality of cache units.

12. The non-transitory computer-readable medium of claim 8, the processing device further to:
receive a request to access a data store; and
select the first cache unit from the plurality of cache units to service the request.

13. The non-transitory computer-readable medium of claim 8, wherein to determine that the hit ratio is below the first hit ratio threshold associated with the first cache unit and above the second hit ratio threshold associated with the second cache unit the processing device further to:
identify a first number indicative of a number of data requests received by the first cache unit and the second cache unit within a window, each data request requesting a data unit;
identify a second number indicative of a number of the data requests within the window requesting a data unit in the first dataset of the plurality of datasets;
identify the hit ratio of the first cache unit and the second cache unit by dividing the second number by the first number; and compare the hit ratio to the first hit ratio threshold and the second hit ratio threshold.

14. The non-transitory computer-readable medium of claim 8, the processing device further to generate the plurality of datasets, wherein to generate the plurality of datasets, the processing device further to:
receive a first plurality of data requests requesting a respective first plurality of data units;
load the first plurality of data units into the first cache unit;
receive a second plurality of data requests requesting a respective second plurality of data units;
determine a hit ratio of the first cache unit in responding to the second plurality of data requests;
determine that the hit ratio of the first cache unit in responding to the second plurality of data requests is below a dataset generation hit ratio threshold; and
responsive to the determination that the hit ratio of the first cache unit in responding to the second plurality of data requests is below a dataset generation hit ratio threshold, store the first plurality of data units as the first dataset of the plurality of datasets.

15. A system comprising:
a memory to store a plurality of datasets;
a processing device, operatively coupled to the memory, to:
load a first dataset of the plurality of datasets into a first cache unit and a second cache unit of a plurality of cache units;
determine that a hit ratio is below a first hit ratio threshold associated with the first cache unit and above a second hit ratio threshold associated with the second cache unit, wherein the first hit ratio threshold is different from the second hit ratio threshold; and
responsive to determining that the hit ratio is below the first hit ratio threshold associated with the first cache unit and above the second hit ratio threshold associated with the second cache unit, load a second dataset of the plurality of datasets into the first cache unit, wherein the first dataset of the plurality of datasets is different than the second dataset of the plurality of datasets.

16. The system of claim 15, wherein the processing device is further to:
load the first dataset of the plurality of datasets into a third cache unit of the plurality of cache units;
determine that the hit ratio is below the second hit ratio threshold associated with the second cache unit; and
responsive to the determination that the hit ratio of is below the second hit ratio threshold associated with the second cache unit, load a third dataset of the plurality of datasets into the second cache unit, wherein the third dataset is different from the first dataset and the second dataset of the plurality of datasets.

17. The system of claim 15, wherein the processing device is further to:
determine that the hit ratio is below the first hit ratio threshold associated with the first cache unit and equal to the second hit ratio threshold associated with the second cache unit; and
responsive the determination that the hit ratio is below the first hit ratio threshold associated with the first cache unit and equal to the second hit ratio threshold associated with the second cache unit, load the second dataset of the plurality of datasets into the first cache unit.

18. The system of claim 15, wherein the processing device is further to:
receive an alteration to the first dataset of the plurality of datasets; and
in response to receiving the alteration, load an altered first dataset of the plurality of datasets into other cache units of the plurality of cache units.

19. The system of claim 15, wherein to determine that the hit ratio is below the first hit ratio threshold associated with the first cache unit and above the second hit ratio threshold associated with the second cache unit, the processing device is to:
identify a first number indicative of a number of data requests received by the first cache unit and the second cache unit within a window, each data request requesting a data unit;
identify a second number indicative of a number of the data requests requesting a data unit in the first dataset of the plurality of datasets within the window;
identify the hit ratio of the first cache unit and the second cache unit by dividing the second number by the first number; and
compare the hit ratio to the first hit ratio threshold and the second hit ratio threshold.

20. The system of claim 15, the processing device further to generate the plurality of datasets, wherein to generate the plurality of datasets, the processing device further to:
receive a first plurality of data requests requesting a respective first plurality of data units;
load the first plurality of data units into the first cache unit;
receive a second plurality of data requests requesting a respective second plurality of data units;
determine a hit ratio of the first cache unit in responding to the second plurality of data requests;
determine that the hit ratio of the first cache unit in responding to the second plurality of data requests is below a dataset generation hit ratio threshold; and
responsive to the determination that the hit ratio of the cache unit in responding to the second plurality of data requests is below a dataset generation hit generation threshold, store the first plurality of data units as the first dataset of the plurality of datasets.

* * * * *